United States Patent [19]
Kim et al.

[11] Patent Number: 5,969,816
[45] Date of Patent: Oct. 19, 1999

[54] DIRECTION SWITCHED MODE-LOCKED LASER GYROSCOPE

[75] Inventors: Byoung Yoon Kim; Sun Hyok Chang; Seong Joon Ahn, all of Taejon, Rep. of Korea

[73] Assignee: Korea Advanced Institute of Science and Technology, Taejon, Rep. of Korea

[21] Appl. No.: 09/094,988

[22] Filed: Jun. 15, 1998

[30] Foreign Application Priority Data

Jul. 5, 1997 [KR] Rep. of Korea .................. 97-31241

[51] Int. Cl.⁶ .................................................. G01C 19/72
[52] U.S. Cl. ................................................ 356/350; 372/6
[58] Field of Search ............................. 356/350; 372/1, 372/6, 94; 385/12, 14

[56] References Cited

U.S. PATENT DOCUMENTS

| | | | |
|---|---|---|---|
| 5,108,183 | 4/1992 | Fling et al. ............................ | 356/350 |
| 5,453,836 | 9/1995 | Kim et al. ............................ | 356/350 |
| 5,684,590 | 11/1997 | Sanders et al. ....................... | 356/350 |

OTHER PUBLICATIONS

M.Y. Jeon et al., "Mode–locked Fiber Laser Gyroscope", Optics Letters, pp. 320–322, vol. 18, No. 4, 1993.
W.W. Chow et al., "The Ring Laser Gyro", Rev. Of Mod. Phys., pp. 61–107, vol. 57, No. 1, 1985.
R.A. Bergh et al., "An Overview of Fiber–Optic Gyroscopes", Journal of Lightwave Technology, pp. 91–107, vol. LT–2, No. 2, 1984.

*Primary Examiner*—Samuel A. Turner
*Attorney, Agent, or Firm*—Oliff & Berridge, PLC

[57] ABSTRACT

This invention relates to a laser gyroscope. This invention provides a direction-switched mode-locked laser gyroscope, comprising: a laser resonator including a laser gain medium and an optical path, one end of the resonator being connected to a reflector and the other end of the resonator being composed of a Sagnac loop; wherein the gyroscope is operated by pulses generated from an optical switch connected to the Sagnac loop. The laser gyroscope according to the invention has a better durability than a conventional He-Ne type laser gyrocope. It can produce an output signal which can be processed more simply than that of the interferometric fiber-optic gyroscope since the output signal is characterized by frequencies corresponding to the rotation rate. The gyroscope operates to produce a pulse output, reducing lock-in effect compared with a gyroscope producing continuous wave output.

18 Claims, 7 Drawing Sheets

DIRECTION SWITCHED MODE-LOCKED LASER GYROSCOPE

BACKGROUND OF THE INVENTION

1. Field of the Invention

The present invention relates to a gyroscope, more particularly to a direction-switched mode-locked laser gyroscope.

2. Description of the Prior Art

Lasers have been used only as light sources of various optical systems. However, sensors using the characteristic change of lasers depending on external physical parameters were recently suggested. Especially, with the development of optical fiber lasers, fiber laser sensors using the optical fiber laser are developed. The fiber laser sensor has many advantages of simple system configuration, simple signal-processing and the like.

Two types of optical rotation sensors have been developed over the past decade: the ring laser gyroscope and the interferometric fiber-optic gyroscope.

FIG. 1 schematically shows a ring laser gyroscope of the prior art. Referring to FIG. 1, a laser gain medium 104 is disposed in a laser resonator composed of two reflecting mirrors 101, 102 and a partially reflecting mirror 103. The ring laser gyroscope of the above configuration is disclosed in the following reference : W. W. Chow et al. "The ring laser gyro", Rev. of Mod. Phys., Vol. 57, No. 1, P61, January 1985. Therefore, detailed explanation of the ring laser gyroscope will be omitted. Briefly explaining the operation of the gyroscope, laser gain medium 104 emits light by the supply of external energy, that is, optical pumping. The light is amplified in the resonator. Some of the amplified light, that is laser beam, passes through the partially reflecting mirror. There are two modes in the resonator : the first one 109 that is rotating clockwise, and the second one 110 that is rotating counterclockwise. The output laser beams emitting from partially reflecting mirror 103 interfere with each other after being combined by a beam splitter 107. The interference signals are then detected by a photo detector 108. If the resonator rotates, two modes 109 and 110 experience different resonator lengths, respectively. Hence they have different frequencies and the rotation rate can be measured by detecting the beat frequency at photo detector 108. The ring laser gyroscope using He-Ne gas gain medium is already commercialized, but it has relatively short lifetime and shows low durability to mechanical shock.

FIG. 2 schematically shows the configuration of an interferometric fiber-optic gyroscope different from the ring laser gyroscope. The feature of its configuration is described in the following reference: R. A. Bergh, H. J. Shaw, "An overview of Fiber-Optic Gyroscope", J. of Lightwave Technology, Vol. LT-2, P91, 1984.

Referring to FIG. 2, a light beam from a light source 201 is split by 50:50 at a 3-dB directional coupler 203 and the separated beams propagate in opposite directions around a Sagnac loop 206. The two beams are recombined at directional coupler 203. If the two beams experience different phases whose difference is $\Delta\phi$, the light intensity detected by photo detector 204 after passing through directional coupler 202 is proportional to $1+\cos(\Delta\phi)$. If this system rotates, the rotation rate can be obtained by measuring the intensity of output light beams since $\Delta\phi$ is proportional to the rotation rate. In general, the Sagnac interferometer employs expensive polarization maintaining optical fiber to eliminate error factors, which results in high system cost. Moreover, high-performance polarizers and complex signal-processing to read phase difference also make it difficult to lower the cost.

Recently a mode-locked fiber laser gyroscope was suggested. FIG. 3 shows the basic configuration of the mode-locked fiber laser gyroscope. The feature of this gyroscope is described in the following reference: "Mode-Locked Fiber Laser Gyroscope", Opt. Lett., Vol. 13, No. 4, P320, Feb. 15, 1993.

Referring to FIG. 3, one end of the laser resonator is composed of a reflector 301 and the other end of the resonator is composed of a Sagnac interferometer 303. Laser light can be generated by optically pumping the gain medium 302. The power of the output light 307 from Sagnac interferometer 303 has a value of $(1+\cos\phi_{nr})/2$ multiplied by the power of the input light 308. Here, $\phi_{nr}$ represents a nonreciprocal phase. If $\phi_{nr}$ is zero, the output power from the Sagnac interferometer is equal to the input light, which explains the fact the interferometer 303 is also called as Sagnac loop mirror. The nonreciprocal phase $\phi_{nr}$ can be modulated to satisfy $\phi_{nr}=\phi_M\sin\omega t$ by phase modulator 304 inside the Sagnac loop mirror, which results in the modulated reflectivity of the loop mirror.

If the period of the modulation is adjusted to be same with the round trip time, mode locking occurs and a train of laser pulses is generated instead of continuous wave laser light. The reflectivity-modulation of a stationary loop mirror would give two pulses for one period of phase modulation as shown in FIG. 4B. If the laser rotates, $\phi_{nr}$ is changed to $\phi_{nr}=\phi_R+\phi_M\sin\omega t$, where the nonreciprocal phase $\phi_R$ is induced by the rotation, as shown in FIG. 4A. In this case, the spacing between the two pulses is altered since the reflectivity varies as shown in FIG. 4C. Therefore, the rotation rate can be obtained by measuring the spacing between the two pulses in the mode-locked fiber-optic gyroscope shown in FIG. 3.

However, the measurement of the spacing between pulses in the signal processing is much more difficult compared with the frequency measurement in the conventional ring laser gyroscope or the gyroscope according to the present invention.

SUMMARY OF THE INVENTION

Therefore, it is an object of the present invention to provide a direction-switched mode-locked laser gyroscope having a laser resonator, one end of the resonator being connected to a reflector and the other end of the resonator being composed of a Sagnac loop, to generate mode-locked laser pulses by the operation of an optical switch.

It is another object of the present invention to provide a direction-switched mode-locked laser gyroscope that can produce an output signal more simply processed than that of the interferometric fiber-optic gyroscope.

It is yet another object of the present invention to provide a direction-switched mode-locked laser gyroscope that employs inexpensive optical elements.

It is a still further object of the present invention to provide a direction-switched mode-locked laser gyroscope that can prevent lock-in effect.

In order to accomplish the aforementioned objects, the present invention provides a direction-switched mode-locked laser gyroscope, comprising: a laser resonator including a laser gain medium and an optical path, one end of the resonator being connected to a reflector and the other end of the resonator composed of a Sagnac loop; wherein the gyroscope is operated by pulses generated from an optical switch connected to the Sagnac loop.

There exist a pair of pulses propagating in different directions inside the Sagnac loop of this gyroscope. If the Sagnac loop rotates, the two pulses do not have the same optical frequency whose difference is proportional to the rotation rate. Therefore, the rotation rate can be read from the measurement of the frequency difference.

BRIEF DESCRIPTION OF THE DRAWINGS

The detailed description particularly refers to the accompanying drawings in which.

DETAILED DESCRIPTION OF THE PREFERRED EMBODIMENTS

Hereinafter, preferred embodiments of the present invention will be described referring to the accompanying drawings.

Figure 1:
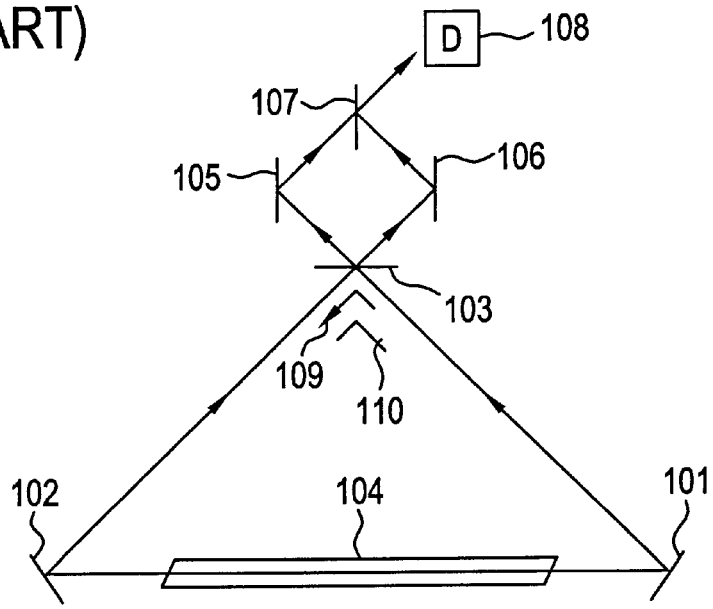
FIG. 1 is an illustration in schematic form of a ring laser gyroscope of the prior art.
Figure 2:
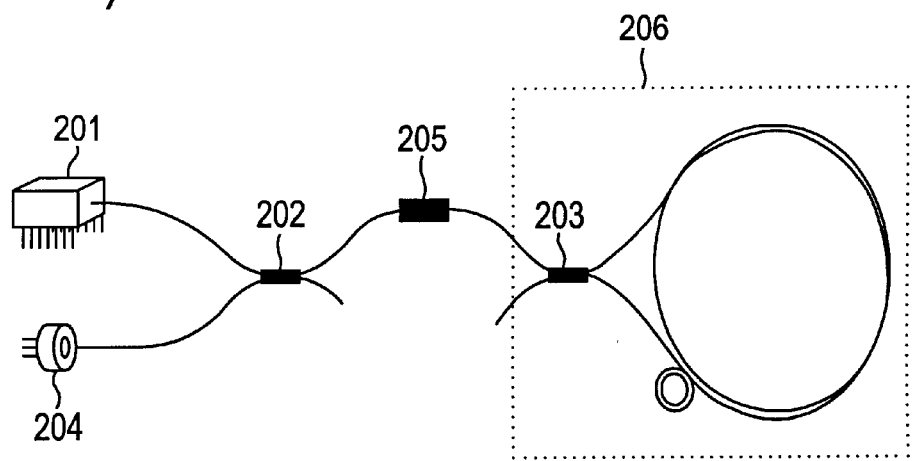
FIG. 2 is an illustration in schematic form of an interferometric fiber-optic gyroscope of the prior art.
Figure 3:
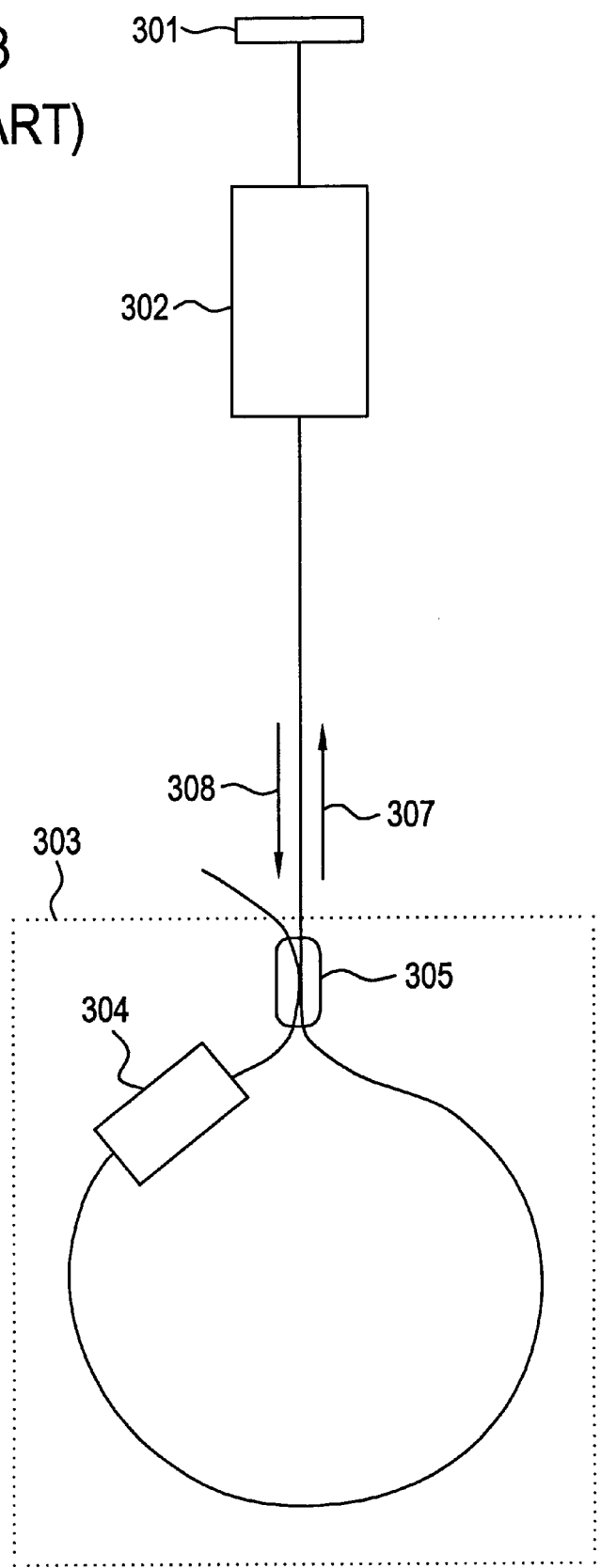
FIG. 3 is an illustration in schematic form of a mode-locked fiber laser gyroscope of the prior art.
Figure 4A:
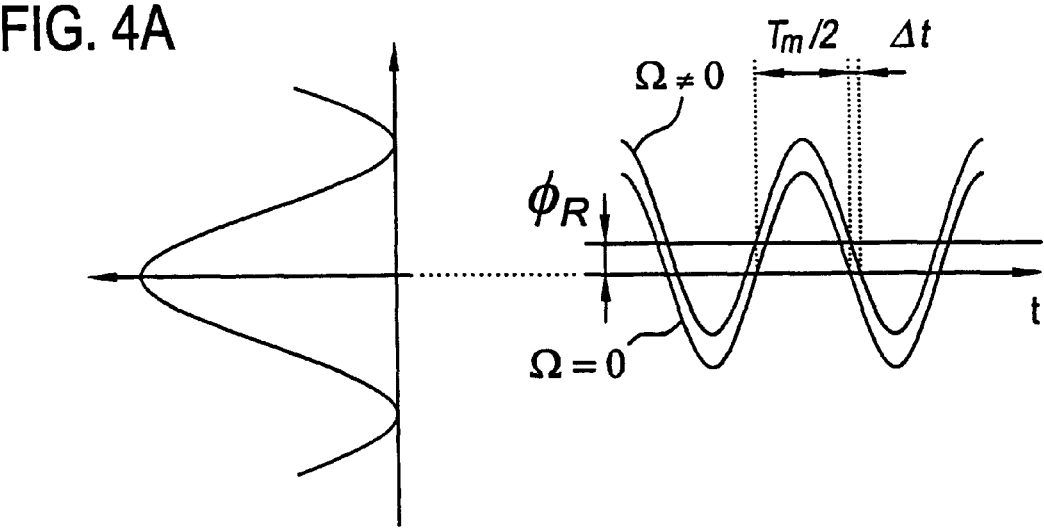
FIG. 4A to FIG. 4C are illustrations in graphic form of the reflectivity modulation of the Sagnac loop mirror.
Figure 4B:
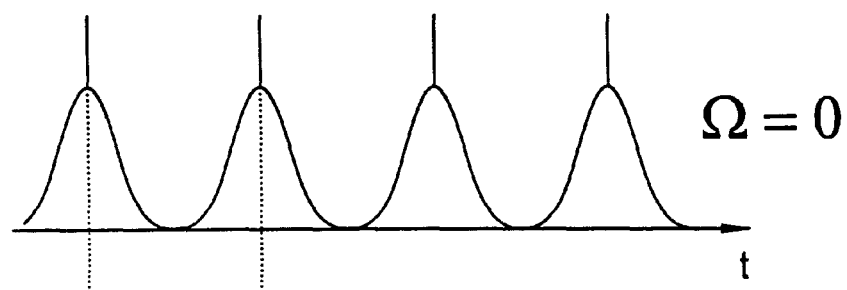
Figure 4C:
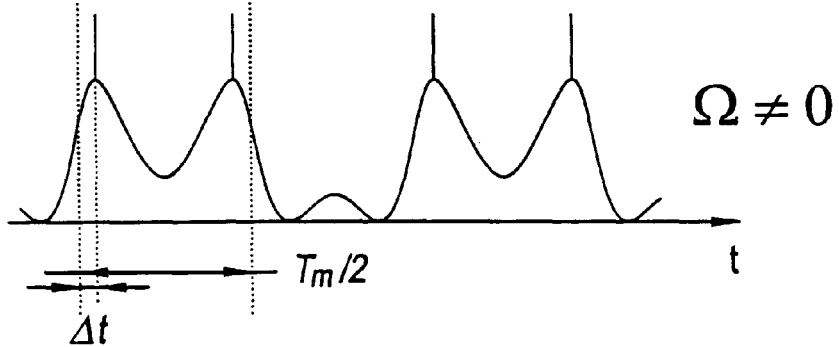
Figure 5:
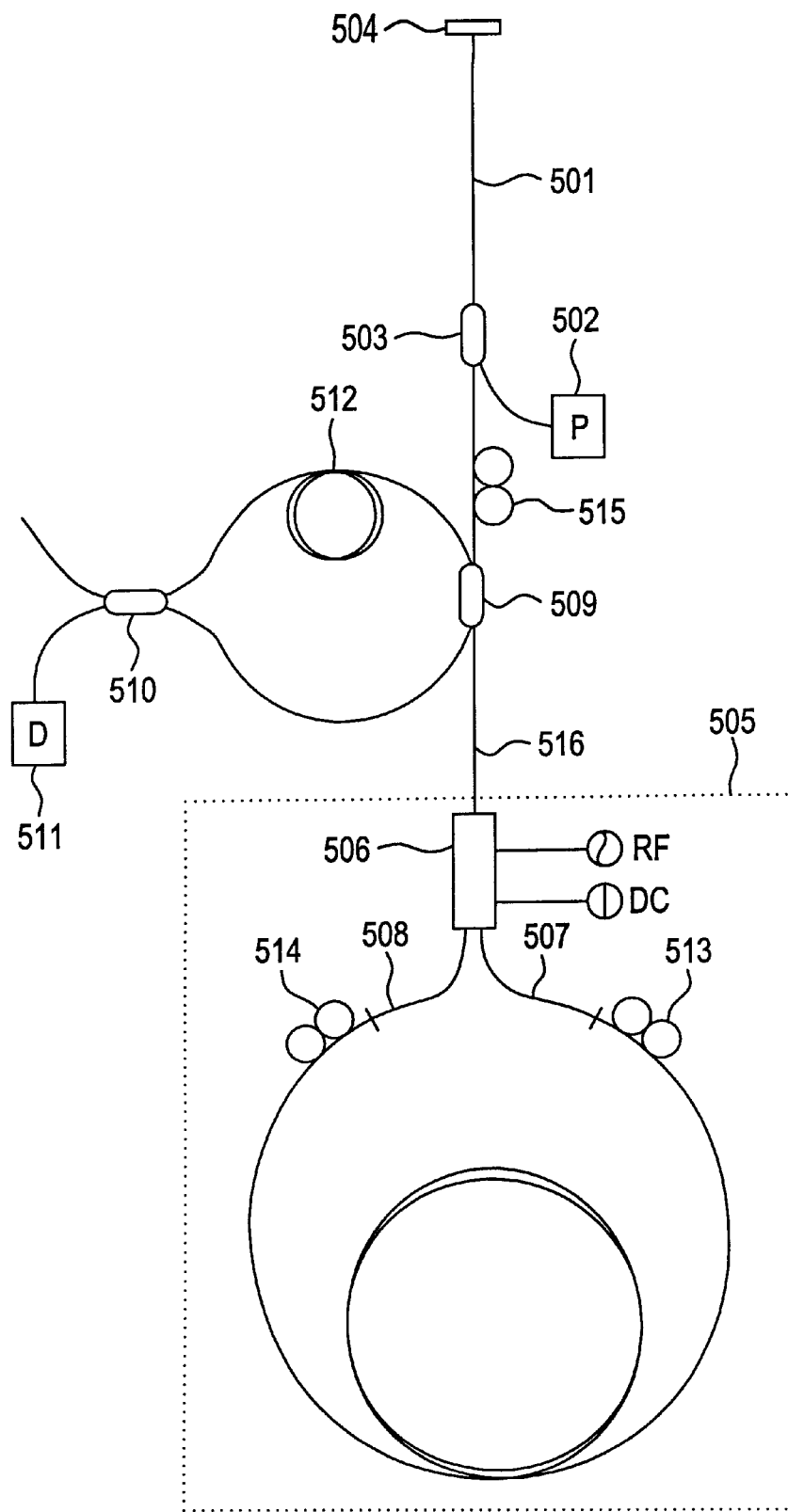
FIG. 5 is an explanatory diagram showing the arrangement of the first embodiment of this invention.

FIG. 5 is an explanatory diagram showing the arrangement of the first embodiment of this invention. A length of erbium-doped optical fiber 501 is used as a gain medium. A pump beam 502 from a light source such as $Ar^+$ laser or a laser diode is injected to erbium-doped fiber 501 through a wavelength division multiplexer 503. The erbium-doped fiber absorbs the pump beam to emit light in a wavelength of 1.53μm. The emitted light is amplified by the stimulated emission in the gain medium and grows to the laser light after propagating in the resonator many times.

Figure 6:
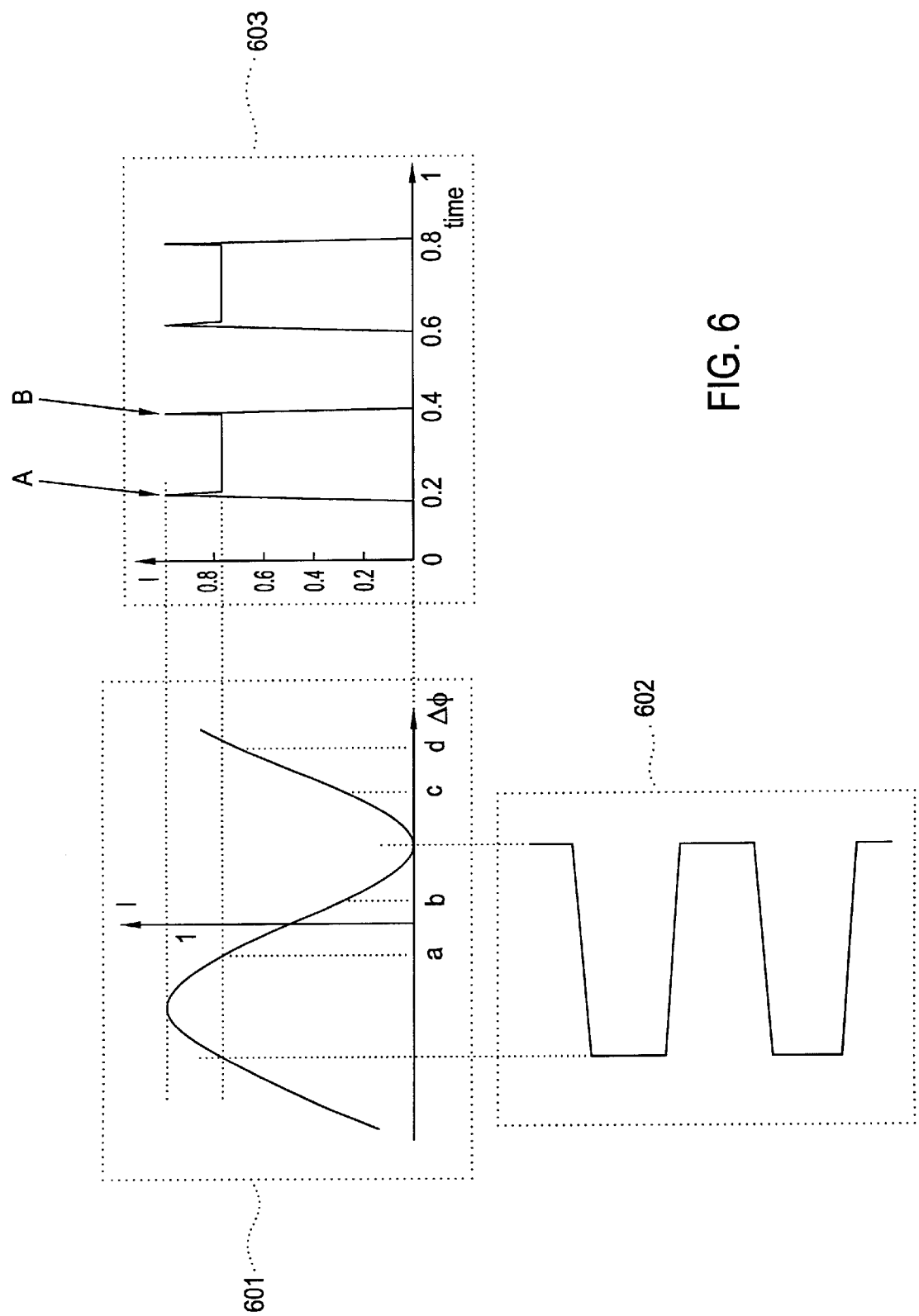
FIG. 6 is an illustration in graphic form showing the principle of the modulation using a lithium niobate optical switch.

The resonator of the laser is composed of a reflecting mirror 504 and a Sagnac loop 505. A mirror or a fiber Bragg grating can be used as a reflecting mirror. A polarization maintaining fiber in a length of 1 m is used for optical path 507, 508, and a conventional single mode fiber is used for other portions. $L_{loop}$ is longer than $2L_{linear}$, where $L_{linear}$ is the distance between reflecting mirror 504 and an optical switch 506, and $L_{loop}$ is the overall length of the Sagnac loop. The state of the polarization("SOP") of the light in Sagnac loop 505 is controlled by polarization controllers 513, 514. The SOP of the light in the linear part is controlled by a polarization controller 515. Optical switch 506 is preferably a Mach-Zehnder type 1×2 optical switch which is fabricated on a lithium niobate ($LiNbO_3$) substrate and pigtailed by an optical fiber. The transmission of the optical switch is modulated by applying an electrical signal to the optical switch. FIG. 6 shows the principle of the modulation using the lithium niobate optical switch.

The output of one direction of the Mach-Zehnder interferometer is represented by reference numeral 601 with respect to the phase difference $\Delta\phi$ between the two arms of the interferometer. In this configuration, a square wave electrical signal having a period equal to the round trip time of the laser resonator is applied to the optical switch. A DC voltage is also applied to the optical switch so that the DC bias of the interferometer can have a level of point "a" in reference numeral 601. The combined electrical signals modulate $\Delta\phi$ as indicated by reference numeral 602. Therefore, the transmission of one output arm of the optical switch is as shown in reference numeral 603. At the points "A" and "B" of maximum transmission, the mode-locked laser pulses are generated by the amplitude modulation mode-locking.

The mode-locking is a well-known technology which is used to obtain short optical pulses using a laser. In the mode-locking, pulsed output is obtained since there exists many phase-locked longitudinal modes at the same time. This technology is described in detail in the following reference: A. E. Siegman, "Lasers", Chap. 27 University Science Books, Mill Valley Calif., 1986.

Provided that the direction having a transmission shown in reference numeral 603 of FIG. 6 is connected to optical fiber 516 and the first polarization maintaining optical fiber 507 and the transmission function is defined as T(t), the transmission to the connected direction of optical fiber 516 and the second polarization maintaining optical fiber 508 is 1−T(t).

Accordingly, if the pulse generated at point "A" of the waveform in reference numeral 603 of FIG. 6 propagates to the direction of the first polarization maintaining optical fiber 507, it propagates well when it returns to the optical switch after passing through the Sagnac loop since it experiences no loss.

However, if the pulse generated at point "A" propagates to the direction of optical fiber 516, it decays since it experiences great loss when it arrives at the optical switch again (since $L_{loop}$ is longer than $2L_{linear}$). Therefore, the pulse generated at point "A" can propagate only in clockwise("CW") in the Sagnac loop.

On the contrary, if the pulse generated at point "B" propagates to the direction of the first polarization maintaining optical fiber 507, it decays when it turns back to the optical switch after passing through the Sagnac loop since it experiences great loss. Accordingly, if the pulse generated at point "B" propagates to the direction of the second polarization maintaining optical fiber 508, it can propagate well when it again arrives at the optical switch since it experiences no loss. Therefore, the pulse generated at point "B" can propagate only in counter-clockwise ("CCW") in the Sagnac loop. As described above, this gyroscope is operated so that a CW propagating pulse and a CCW propagating pulse can be generated in the Sagnac loop over one period by modulating the transmission as shown in FIG. 6.

If the DC bias applied to the optical switch varies to have a level corresponding to "b", "c", "d" or the like as shown in reference numeral 601 of FIG. 6, the position as well as the spacing of the two pulses can be changed. This gyroscope is operated so that a CW pulse and a CCW pulse can be lased in the Sagnac loop over one period. It is also operated so that the CW propagating pulse propagates always in the CW direction and the CCW propagating pulse propagates always in the CCW direction at the Sagnac loop. After portions of these pulses in the resonator are extracted by a directional coupler 509, the two pulses which propagated in opposite directions in the Sagnac loop are combined by a directional coupler 510 and detected by a photo detector.

Figure 7:
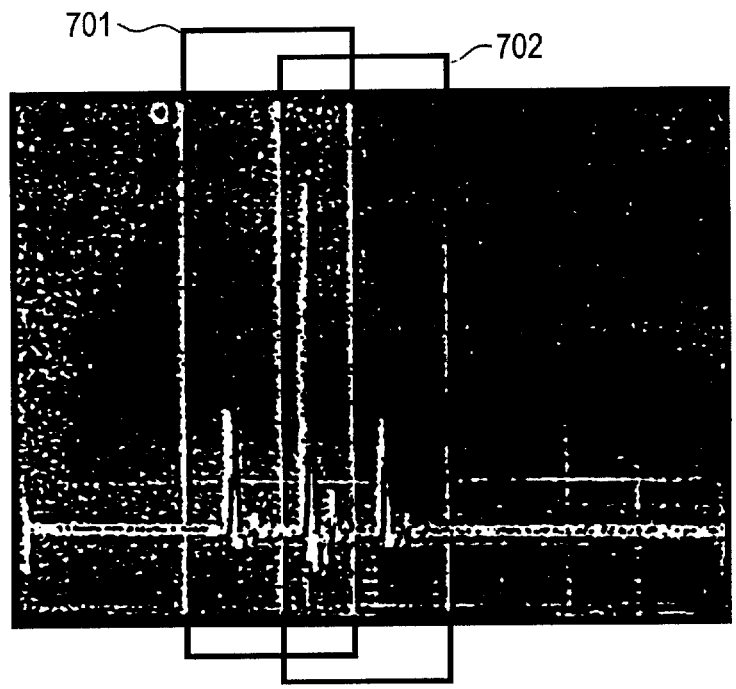
FIG. 7 is a photograph of the interference of the output pulses.

FIG. 7 is a photograph of the interference of the two pulses. Referring to FIG. 7, reference numeral 701 represents two pulses coming out from the resonator while the pulses propagates from the optical switch to the mirror. On the contrary, reference numeral 702 represents two pulses coming out from the resonator while the pulses propagates from the mirror to the optical switch. Therefore, appropriate time delay makes the CW pulse and the CCW pulse meet at the directional coupler 510, thereby the two pulses can interfere with each other. If the laser rotates, the counter-propagated two pulses have different frequencies, the difference of which is proportional to the rotation rate. The rotation rate can be read by measuring the beat frequency using a photo detector.

Figure 8:
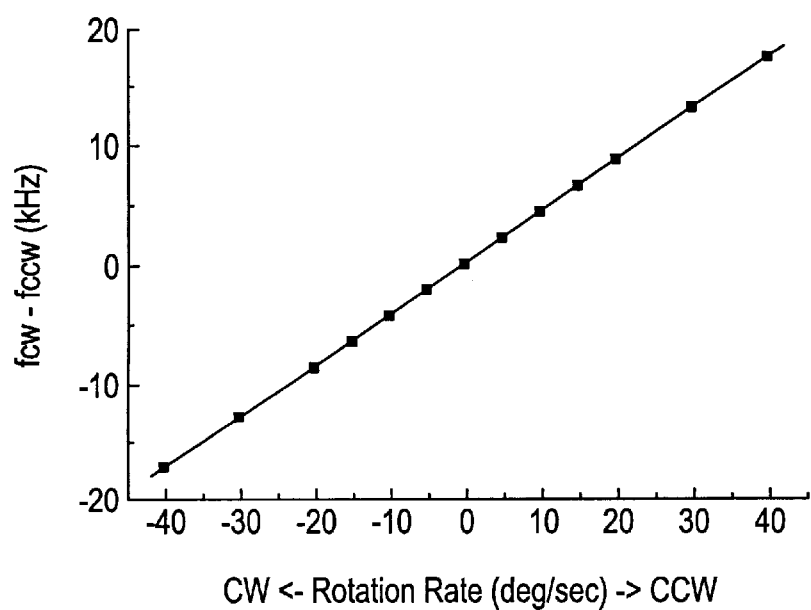
FIG. 8 is a graph showing a plot of the variation of the interference frequency as a function of the rotation rate.

FIG. 8 shows the beat frequency of the two pulses according to the rotation rate. Referring to FIG. 8, the slope of the line is $4A/\lambda nL$ (wherein A is an area of the Sagnac loop, $L=L_{loop}+2L_{linear}$, n is the refractive index of the optical fiber, and $\lambda$ is the wavelength of the laser light). The measured slope is equal to the theoretical value, which means this laser performs the function of a gyroscope.

Figure 9:
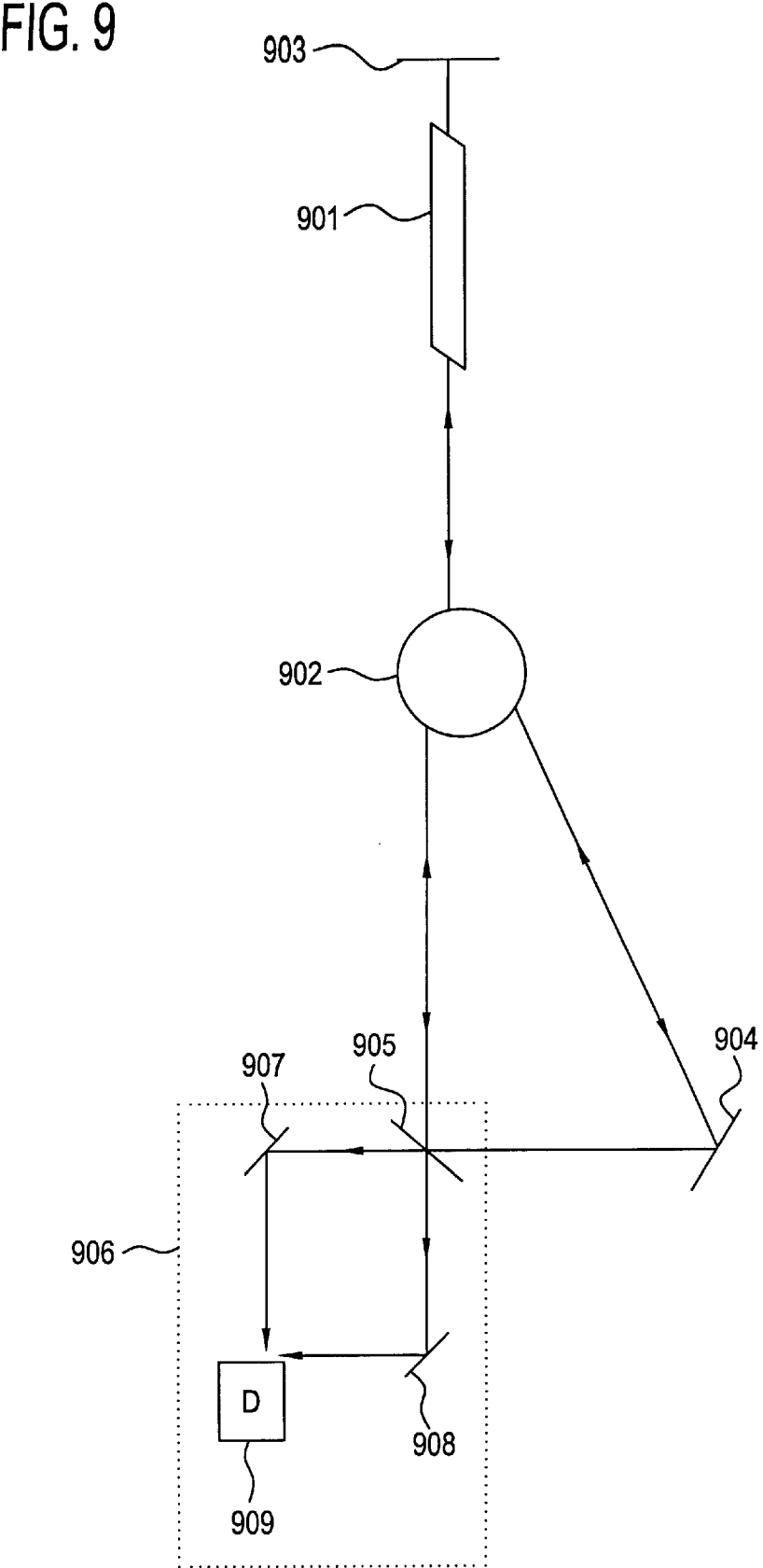
FIG. 9 is an explanatory diagram showing the arrangement of the second embodiment of this invention.

FIG. 9 shows other configuration of a laser gyroscope according to the present invention. In this gyroscope, the laser gain medium can be any one selected from a He-Ne discharge tube, a ruby rod, a diode amplifier and the like (for example, a Nd:YAG rod, a dye cell, etc.). The optical switch can be any one selected from an acousto-optic modulator, an electro-optic modulator, an integrated optical device and the like.

Reference numerals 903, 904, 905 represent reflecting mirrors which comprise a resonator. Optical switch 902 should induce mode-locking and operate to make CW pulses and CCW pulses at the Sagnac loop.

Reference numeral 906 is a set-up for making the counter-propagating pulses interfere with each other. Mirrors 907, 908 combine the CW and CCW pulses coming out from mirror 905 at the photo detector, thereby frequency difference can be detected.

New laser gyroscope is disclosed herein. Especially, the laser gyroscope having an optical fiber resonator shown in FIG. 5 has many advantages. It has a better durability than the ring laser gyroscope.

It can produce an output signal that can be much simply processed than that of the interferometric fiber-optic gyroscope since the output signal is characterized by frequencies corresponding to the rotation rate.

Furthermore, this laser gyroscope does not have to use long polarization maintaining fiber, thereby reducing costs. The gyroscope operates to produce a pulse output, alleviating the lock-in effect compared with a gyroscope producing continuous wave output.

What is claimed is:

1. A direction-switched mode-locked laser gyroscope, comprising:

a laser resonator including a laser gain medium and an optical path, one end of the resonator being connected to a reflector and the other end of the resonator being composed of a Sagnac loop;

wherein the gyroscope is operated by pulses generated from an optical switch connected to said Sagnac loop.

2. The direction-switched mode-locked laser gyroscope of claim 1, wherein said laser gain medium includes an erbium doped optical fiber.

3. The direction-switched mode-locked laser gyroscope of claim 1, wherein the reflector includes an optical fiber Bragg grating.

4. The direction-switched mode-locked laser gyroscope of claim 1, wherein all or some section of said optical path is configured to an optical fiber.

5. The direction-switched mode-locked laser gyroscope of claim 1, wherein the distance between said reflector and said optical switch is less than half of the entire length of the Sagnac loop.

6. The direction-switched mode-locked laser gyroscope of claim 1, wherein said Sagnac loop is provided with a clockwise polarization controller and a counter-clockwise polarization controller to control the polarization state of light in the interferometer.

7. The direction-switched mode-locked laser gyroscope of claim 1, wherein said optical switch is a Mach-Zehnder interferometer type 1×2 optical switch fabricated on a lithium niobate substrate.

8. The direction-switched mode-locked laser gyroscope of claim 1, wherein said laser gain medium is any one selected from the group consisting of He-Ne gas, a Nd-YAG rod, a Nd:glass rod, a Nd rod, a ruby rod, a dye cell, rare earth element doped optical fiber and a diode amplifier.

9. The direction-switched mode-locked laser gyroscope of claim 1, wherein said optical path is any one selected from the group consisting of vacuum, air, glass, lithium niobate crystal, organic crystal and optical fiber.

10. The direction-switched mode-locked laser gyroscope of claim 1, wherein said reflector is any one selected from the group consisting of a reflecting mirror, an optical fiber Bragg grating, a Faraday reflecting mirror and an optical wavelength filter.

11. The direction-switched mode-locked laser gyroscope of claim 1, wherein said optical switch is any one selected from the group consisting of an acousto-optic modulator, an electro-optic modulator and an integrated optical device.

12. The direction-switched mode-locked laser gyroscope of claim 1, wherein the modulating period of said optical switch is equal to the round trip time of light in the resonator.

13. The direction-switched mode-locked laser gyroscope of claim 1, wherein the modulating period of said optical switch is equal to 1/n of the round trip time of light in the resonator, where n is an integer.

14. The direction-switched mode-locked laser gyroscope of claim 1, wherein said output is in a form of train pulses by the mode-locking of the laser performed by said optical switch.

15. The direction-switched mode-locked laser gyroscope of claim 12, wherein said output is in a form of train pulses by the mode-locking of the laser performed by said optical switch.

16. The direction-switched mode-locked laser gyroscope of claim 13, wherein said output is in a form of train pulses by the mode-locking of the laser performed by said optical switch.

17. The direction-switched mode-locked laser gyroscope of claim 1, wherein said optical switch operates to make clockwise pulses always propagate clockwise and counter-clockwise pulses always propagate counter-clockwise in the Sagnac loop.

18. The direction-switched mode-locked laser gyroscope of claim 1, further comprising:

an optical system for extracting partial energies of cw pulses and ccw pulses propagated in said Sagnac loop and for recombining parts of the two pulses which propagated in opposite directions in the Sagnac loop; and a means for measuring beat frequency proportional to a rotation rate based on the Sagnac effect.

* * * * *